United States Patent
Qiu

(10) Patent No.: US 11,955,832 B2
(45) Date of Patent: Apr. 9, 2024

(54) CONTROL CIRCUIT, POWER SUPPLY STRUCTURE, AND ELECTRONIC CIGARETTE

(71) Applicant: JOYETECH EUROPE HOLDING GMBH, Zug (CH)

(72) Inventor: Weihua Qiu, Changzhou (CN)

(73) Assignee: JOYETECH EUROPE HOLDING GMBH, Zug (CH)

( * ) Notice: Subject to any disclaimer, the term of this patent is extended or adjusted under 35 U.S.C. 154(b) by 1412 days.

(21) Appl. No.: 16/338,004

(22) PCT Filed: Sep. 29, 2017

(86) PCT No.: PCT/CN2017/104337
§ 371 (c)(1),
(2) Date: Mar. 29, 2019

(87) PCT Pub. No.: WO2018/059542
PCT Pub. Date: Apr. 5, 2018

(65) Prior Publication Data
US 2019/0273226 A1    Sep. 5, 2019

(30) Foreign Application Priority Data

Sep. 30, 2016 (CN) .......................... 201610881831.3

(51) Int. Cl.
*H01M 10/46* (2006.01)
*A24F 40/40* (2020.01)
(Continued)

(52) U.S. Cl.
CPC ................ *H02J 7/36* (2013.01); *A24F 40/40* (2020.01); *A24F 40/50* (2020.01); *H01M 50/204* (2021.01); *H01M 50/256* (2021.01); *H01M 50/271* (2021.01); *H01M 50/296* (2021.01); *H02J 7/0024* (2013.01)

(58) Field of Classification Search
CPC ........ H02J 7/36; H02J 7/0024; H01M 50/204; H01M 50/296; H01M 50/271; A24F 40/50; A24F 40/40; Y02E 60/10
USPC ........ 320/107, 110, 114, 115, 116, 117, 121, 320/126
See application file for complete search history.

(56) References Cited

U.S. PATENT DOCUMENTS 9,673,429 B2 *  6/2017  Cho .................... H01M 50/267

FOREIGN PATENT DOCUMENTS

CN          101976740 A       2/2011
CN          103050740 A       4/2013
(Continued)

*Primary Examiner* — Edward Tso
(74) *Attorney, Agent, or Firm* — Cheng-Ju Chiang

(57) ABSTRACT

A control circuit, a power supply structure and an electronic cigarette are disclosed. The power supply structure includes a battery receiving casing, and at least two battery cells are received in the battery receiving casing. The power supply structure further includes a bottom plate provided with contacts, and the bottom plate is disposed in the battery receiving casing. When the at least two battery cells are connected to a first group of contacts on the bottom plate, the at least two battery cells form a serial connection relationship. When the at least two battery cells are connected to a second group of contacts on the bottom plate, the at least two battery cells form a parallel connection relationship.

20 Claims, 5 Drawing Sheets

(51) Int. Cl.
   *A24F 40/50*     (2020.01)
   *H01M 50/204*    (2021.01)
   *H01M 50/256*    (2021.01)
   *H01M 50/271*    (2021.01)
   *H01M 50/296*    (2021.01)
   *H02J 7/00*      (2006.01)
   *H02J 7/36*      (2006.01)

(56) References Cited

FOREIGN PATENT DOCUMENTS

| | | |
|---|---|---|
| CN | 103137935 A | 6/2013 |
| CN | 205005903 U | 2/2016 |
| CN | 206237186 U | 6/2017 |
| DE | 102014019500 A1 | 6/2016 |
| JP | 2011-24430 A | 2/2011 |
| WO | 2015/179318 A1 | 11/2015 |
| WO | 2016/150979 A1 | 9/2016 |

* cited by examiner

CONTROL CIRCUIT, POWER SUPPLY STRUCTURE, AND ELECTRONIC CIGARETTE

CROSS REFERENCE TO RELATED APPLICATION

This application is a 35 U.S.C. §371 National Phase conversion of International (PCT) Patent Application No. PCT/CN2017/104337, filed on Sep. 29, 2017, which claims the priority of Chinese Patent Application No. 201610881831.3, filed on Sep. 30, 2016. The contents of the above-identified applications are incorporated herein by reference. The PCT International Patent Application was filed and published in Chinese.

TECHNICAL FIELD

The present disclosure relates to the technical field of electronic cigarettes, and in particular, to a control circuit, a power supply structure, and an electronic cigarette using the power supply structure.

BACKGROUND

The power connection method in traditional electronic cigarettes generally uses batteries in series or in parallel, and an electronic cigarette uses only one connection method. In this case, in order to realize multi-function output, the electronic cigarette needs to be added with power inductors and full bridge circuits to set up a small power supply to adjust the output voltages. Under normal circumstances, the battery voltage is 3.7V, and the output voltage can be in the range of 0-9V after adjustment. However, the addition of power inductors and full bridge circuits not only generates electromagnetic interference around it, but also increases the cost of the electronic cigarette.

SUMMARY

In view of the above, a first aspect of the present disclosure provides a power supply structure including a battery receiving casing for receiving at least two battery cells, the power supply structure further includes a bottom plate provided with contacts, the bottom plate is disposed in the battery receiving casing;

when the at least two battery cells are connected to a first group of contacts on the bottom plate, the at least two battery cells form a series connection relationship; and when the at least two battery cells are connected to a second group of contacts on the bottom plate, the at least two battery cells form a parallel connection relationship.

In one embodiment, the bottom plate has a first surface and a second surface, the first group of contacts are formed on the first surface, and the second group of contacts are formed on the second surface.

In one embodiment, the at least two battery cells include a first battery cell and a second battery cell, a positive pole of the first battery cell is led out through a lead wire and connected to a first contact member, a positive pole of the second battery cell is led out through a lead wire and connected to a second contact member; the positive pole of the first battery cell is further connected to a positive output terminal of the power supply structure through another lead wire; the power supply structure further includes a third contact member which is led out through a lead wire and connected to the positive output terminal of the power supply structure; the power supply structure further includes a fourth contact member which is led out through a lead wire and connected to a negative electrode of the power supply structure; and the contacts on the bottom plate are electrically connected to the negative pole of the first battery cell, the first contact member, the negative pole of the second battery cell, the second contact member, the third contact member and the fourth contact member, respectively.

In one embodiment, the bottom plate has a first surface and a second surface, the first surface and the second surface are each provided with a first negative contact, a first positive contact, a second contact, a second positive contact, a second negative contact and a ground contact; the first negative contact, the first positive contact, the second contact, the second positive contact, the second negative contact and the ground contact on the first surface are configured for being electrically connected to the negative pole of the first battery cell, the first contact member, the third contact member, the second contact member, the negative pole of the second battery cell and the fourth contact member, respectively; the first negative contact, the first positive contact, the second contact, the second positive contact, the second negative contact and the ground contact on the second surface are configured for being electrically connected to the negative pole of the first battery cell, the first contact member, the third contact member, the second contact member, the negative pole of the second battery cell and the fourth contact member, respectively;

on the first surface, the first negative contact and the second positive contact are electrically connected, the first positive contact and the second contact are electrically connected, the second negative contact and the ground contact are electrically connected; and on the second surface, the first negative contact, the second negative contact and the ground contact are electrically connected, the second contact and the second positive contact are electrically connected.

In one embodiment, the first contact member, the second contact member, the third contact member and the fourth contact member are each pogo pin.

In one embodiment, further including a first reverse protection circuit and a second reverse protection circuit, wherein the first reverse protection circuit is connected between the positive pole of the first battery cell and the positive output terminal of the power supply structure, the second reverse protection circuit is connected between the third contact member and the positive output terminal of the power supply structure.

In one embodiment, further including a cover which cooperates with the battery receiving casing to receive and fix the at least two battery cells and the bottom plate.

In one embodiment, the first surface of the bottom plate is provided with a serial connection identification, and the second surface of the bottom plate is provided with a parallel connection identification.

A second aspect of the present disclosure provides an electronic cigarette including a microcontroller, an atomizing circuit, and the power supply structure according to the first aspect of the present disclosure, wherein a positive output terminal of the power supply structure is connected to power input terminals of the microcontroller and the atomizing circuit, and the microcontroller is electrically connected to the atomizing circuit.

In one embodiment, further including a mode state indicating circuit connected to the microcontroller.

A third aspect of the disclosure provides a control circuit, wherein the control circuit includes a first group of contacts and a second group of contacts;

when the first group of contacts are connected to at least two battery cells, the at least two battery cells form a series connection relationship;

when the second group of contacts are connected to at least two battery cells, the at least two battery cells form a parallel connection relationship.

In one embodiment, the first group of contacts and the second group of contacts are provided on different surfaces of a circuit board.

In one embodiment, the first group of contacts and the second group of contacts are provided on the same surface of a circuit board.

In one embodiment, the first group of contacts are disposed at a first position of the circuit board, the second group of contacts are disposed at a second position of the circuit board, the first position and the second position are symmetrical with respect to a central axis along the distribution direction of the contacts on the circuit board.

In one embodiment, the first group of contacts includes: a first negative contact, a first positive contact and a ground contact; and an Nth contact, an Nth positive contact and an Nth negative contact, wherein N=2, 3, 4, . . . , n, and n is the number of battery cells; the Nth contact is a contact for connecting to a reverse protection circuit;

the nth negative contact is electrically connected to the ground contact, the nth positive contact is electrically connected to the (n-1)th negative contact, the (n-1)th positive contact is electrically connected to the (n-2)th negative contact, and so on, until the second positive contact is electrically connected to the first negative contact; and the first positive contact and the Nth contact are electrically connected.

In one embodiment, the first group of contacts includes: a first negative contact and a ground contact; and an Nth contact, an Nth positive contact and an Nth negative contact, wherein N=2, 3, 4, . . . , n, and n is the number of battery cells;

the nth negative contact is electrically connected to the ground contact, the nth positive contact is electrically connected to the (n-1)th negative contact, the (n-1)th positive contact is electrically connected to the (n-2)th negative contact, and so on, until the second positive contact is electrically connected to the first negative contact.

In one embodiment, the second group of contacts includes: a first negative contact, a first positive contact and a ground contact; and an Nth contact, an Nth positive contact and an Nth negative contact, wherein N=2, 3, 4, . . . , n, and n is the number of battery cells; the Nth contact is a contact for connecting to a reverse protection circuit;

the ground contact is electrically connected to the first negative contact and the Nth negative contact, the Nth positive contact is electrically connected to the Nth contact.

In one embodiment, the second group of contacts includes: a first negative contact and a ground contact; and an Nth contact, an Nth positive contact and an Nth negative contact, wherein N=2, 3, 4, . . . , n, and is the number of battery cells;

the ground contact is electrically connected to the first negative contact and the Nth negative contact, the Nth positive contact is electrically connected to the Nth contact.

A fourth aspect of the present disclosure provides a power supply structure including a battery receiving casing for receiving at least two battery cells, wherein the power supply structure further includes a control circuit according to the third aspect of the present disclosure.

In one embodiment, the battery receiving casing is received with the at least two battery cells which include a first battery cell and an Nth battery cell, wherein N=2, 3, 4, . . . , n, and n is the number of battery cells;

if each group of contacts include a first negative contact, a first positive contact, a ground contact, an Nth contact, an Nth positive contact and an Nth negative contact, wherein N=2, 3, 4, . . . , n, and is the number of battery cells; the Nth contact is a contact for connecting to a reverse protection circuit;

then the positive pole of the first battery cell is connected to the first positive contact through a contact member, the negative pole of the first battery cell is connected to the first negative contact, the negative pole of the Nth battery cell is connected to the Nth negative contact, the positive pole of the Nth battery cell is connected to the Nth positive contact through a contact member, the Nth contact is connected to a contact member, and the ground contact is connected to a contact member.

In one embodiment, the battery receiving casing is received with the at least two battery cells which include a first battery cell and an Nth battery cell, wherein N=2, 3, 4, . . . , n, and n is the number of battery cells;

if each group of contacts include a first negative contact, a ground contact, an Nth contact, an Nth positive contact and an Nth negative contact, wherein N=2, 3, 4, . . . , n, and is the number of battery cells;

then the negative pole of the first battery cell is connected to the first negative contact, the negative pole of the Nth battery cell is connected to the Nth negative contact, the positive pole of the Nth battery cell is electrically connected to the Nth positive contact through a contact member, the Nth contact is connected to a contact member, and the ground contact is connected to a contact member.

A fifth aspect of the present disclosure provides an electronic cigarette, wherein the electronic cigarette includes the control circuit according to the third aspect of the present disclosure.

A sixth aspect of the present disclosure provides an electronic cigarette, wherein the electronic cigarette includes the power supply structure according to the fourth aspect of the present disclosure.

In the above power supply structure and the electronic cigarette, by operating the bottom plate, the battery cells in the electronic cigarette are connected to different contacts on the bottom plate, to thereby change the series or parallel connection relationship of the battery cells for providing different power outputs. The operation is simple and convenient.

DETAILED DESCRIPTION OF PREFERRED EMBODIMENTS

Further description will be made below with reference to the accompanying drawings and embodiments.

Figure 1:
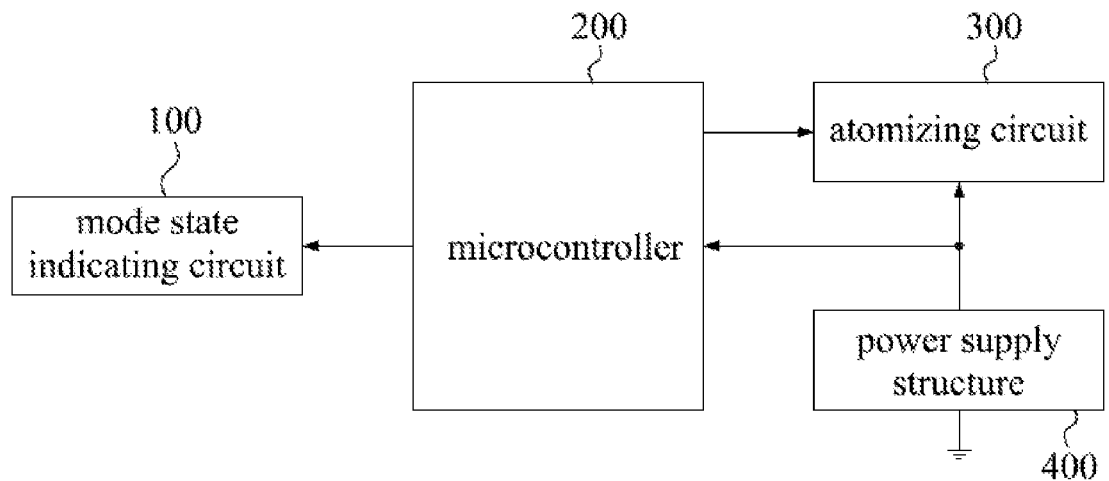
FIG. 1 is a block diagram of an electronic cigarette according to an embodiment.

FIG. 1 is a block diagram of an electronic cigarette according to an embodiment. The electronic cigarette includes a mode state indicating circuit 100, a microcontroller 200, an atomizing circuit 300, and a power supply structure 400. The positive output terminal of the power supply structure 400 is connected to the power input terminals of the microcontroller 200 and the atomizing circuit 300. The microcontroller 200 is electrically connected to the mode state indicating circuit 100 and the atomizing circuit 300, respectively.

The power supply structure 400 supplies power to the microcontroller 200 and the atomizing circuit 300. The microcontroller 200 controls the operation of the atomizing circuit 300, and controls the mode state indicating circuit 100 to indicate a corresponding operating state of the power supply structure 400.

Figure 2:
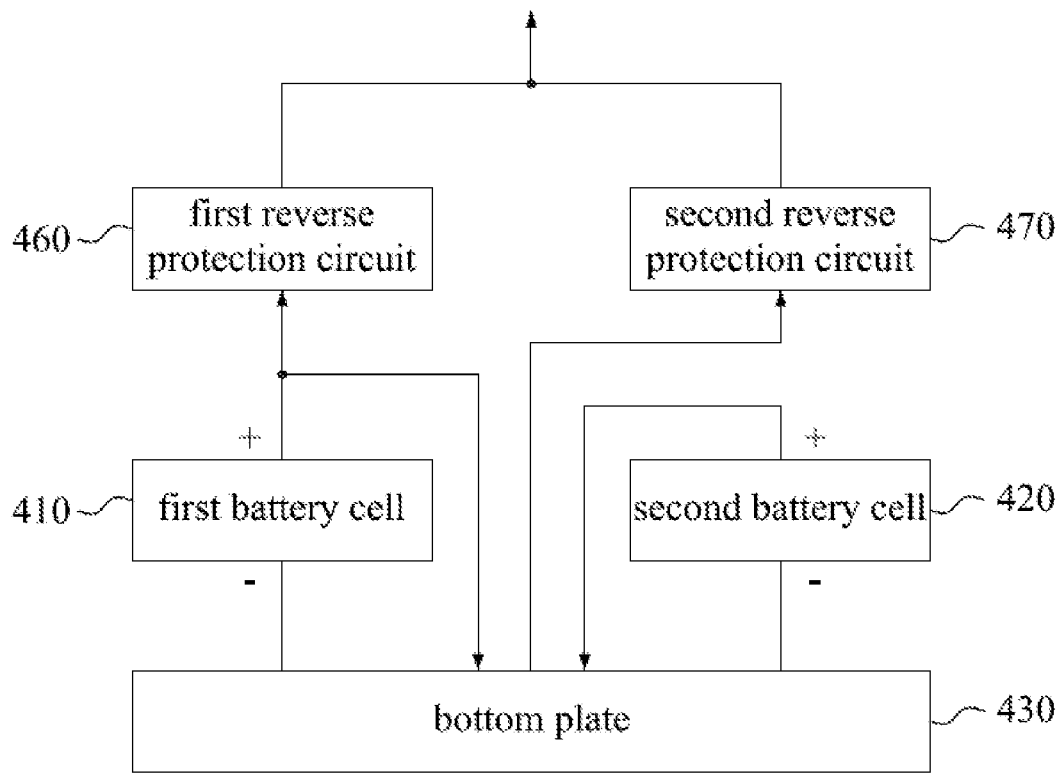
FIG. 2 is a block diagram of the power supply structure of FIG. 1.

FIG. 2 is a block diagram of the power supply structure of FIG. 1. The power supply structure 400 includes a first battery cell 410, a second battery cell 420, and a bottom plate 430. The positive pole (+) and the negative pole (−) of the first battery cell 410, and the positive pole (+) and the negative pole (−) of the second battery cell 420 are all led out and connected to the bottom plate 430 provided with contacts, and by connecting to different contacts, a series connection relationship or a parallel connection relationship is formed. That is, the first battery cell 410 and the second battery cell 420 are connected in series, or the first battery cell 410 and the second battery cell 420 are connected in parallel. It can be understood that the number of battery cells can be multiple, to thereby switch between series connection and parallel connection of two or more battery cells.

In this embodiment, the bottom plate 430 has a first surface 431 and a second surface 432, and the first surface 431 and the second surface 432 are each provided with contacts. When the leading ends of the positive pole and the negative pole of the first battery cell 410 and the second battery cell 420 are connected to the contacts provided on the first surface 431 of the bottom plate 430, the first battery cell 410 and the second battery cell 420 form a series connection relationship. When the leading ends of the positive pole and the negative pole of the first battery cell 410 and the second battery cell 420 are connected to the contacts provided on the second surface 432 of the bottom plate 430, the first battery cell 410 and the second battery cell 420 form a parallel connection relationship. It can be understood that in addition to setting different contacts in the above manner, other methods may be employed, for example, two groups of contacts are disposed at different positions on the same surface of the bottom plate 430 for forming a series connection or parallel connection between the battery cells.

It can be understood that when a group of contacts are provided on each of the first surface and the second surface, the series connection and the parallel connection of the battery cells can be switched by turning over the bottom plate 430. When two groups of contacts are disposed at different positions on the same surface, the series connection and the parallel connection of the battery cells can be switched by rotating or moving the bottom plate 430. It should be noted that the bottom plate is installed at one end of the battery cells in the power supply structure 400, and its relative position in the power supply structure 400 is not limited.

Figure 3:
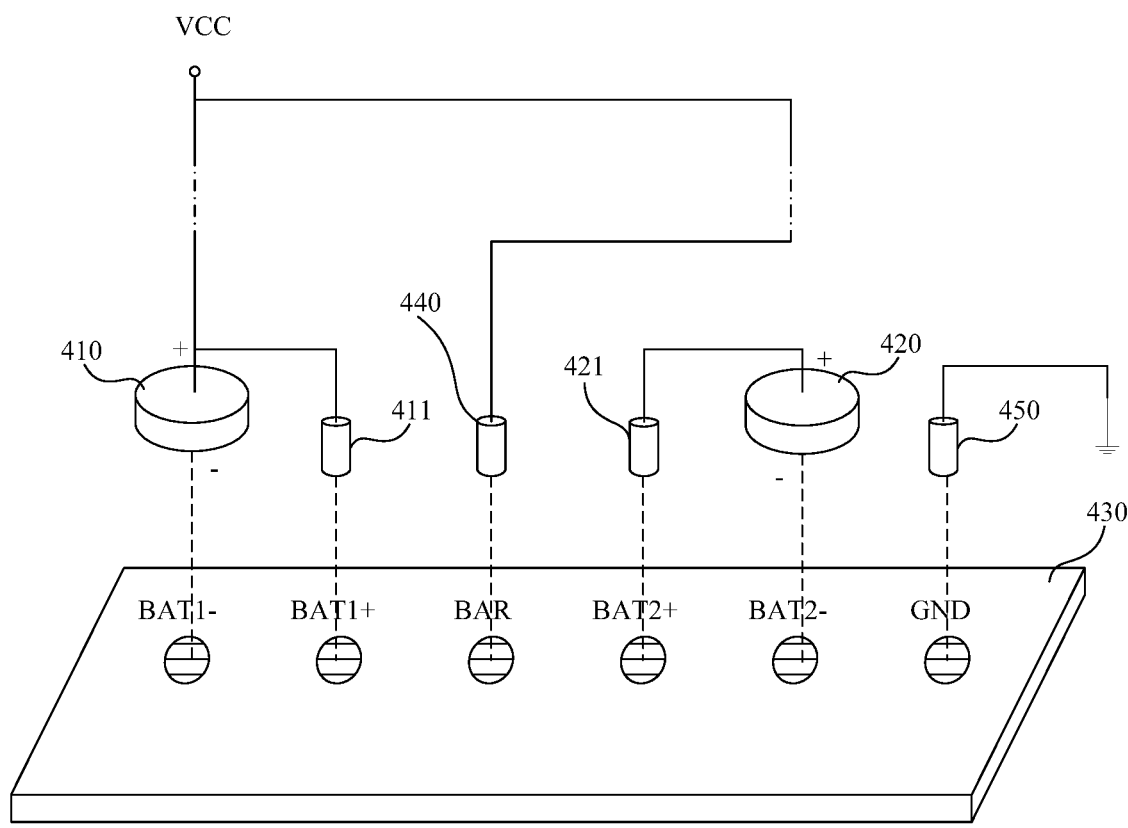
FIG. 3 is a schematic diagram showing a specific lead-out manner of the first battery cell and the second battery cell and the structure of the bottom plate in the power supply structure of FIG. 2.

FIG. 3 shows a specific lead-out manner of the first battery cell 410 and the second battery cell 420 and the structure of the bottom plate 430.

As shown in FIG. 3, the positive pole (+) of the first battery cell 410 is led out through a lead wire and connected to a first contact member 411. The positive pole (+) of the second battery cell 420 is led out through a lead wire and connected to a second contact member 421. The positive pole (+) of the first battery cell 410 is further connected to the positive output terminal (VCC) of the power supply structure 400 through another lead wire. The power supply structure 400 further includes a third contact member 440 which is led out through a lead wire and connected to the positive output terminal (VCC) of the power supply structure 400, and a fourth contact member 450 which is led out through a lead wire and connected to the negative electrode of the circuit board of the electronic cigarette.

The contacts on the bottom plate 430 are electrically connected to the negative pole (−) of the first battery cell 410, the first contact member 411, the negative pole (−) of the second battery cell 420, the second contact member 421 and the third contact member 440, respectively.

Specifically, referring to FIG. 3, the bottom plate 430 has a first surface 431 and a second surface 432. On each of the first surface 431 and the second surface 432, there are provided with a first negative contact (BAT1−), a first positive contact (BAT1+), a second contact (BAR), a second positive contact (BAT2+), a second negative contact (BAT2−), and a ground contact (GND). The first negative contact (BAT1−), the first positive contact (BAT1+), the second contact (BAR), the second positive contact (BAT2+), the second negative contact (BAT2−) and the ground contact (GND) on the first surface 431 are electrically connected to the negative pole (−) of the first battery cell 410, the first contact member 411, the third contact member 440, the second contact member 421, the negative pole (−) of the second battery cell 420 and the fourth contact member 450, respectively. Or optionally, the first negative contact (BAT1−), the first positive contact (BAT1+), the second contact (BAR), the second positive contact (BAT2+), the second negative contact (BAT2−) and the ground contact (GND) on the second surface 432 are electrically connected to the negative pole (−) of the first battery cell 410, the first contact member 411, the third contact member 440, the second contact member 421, the negative pole (−) of the second battery cell 420 and the fourth contact member 450, respectively.

In order to facilitate the user to know the connection relationship between the bottom plate 430 and the battery cells, the first surface of the bottom plate 430 is provided with a serial connection identification, and the second surface is provided with a parallel connection identification. Specifically, it may be designed as a text identifier or a symbol identifier. It is understood that the second contact (BAR) is a contact for connecting to a reverse protection circuit.

Figure 4A:
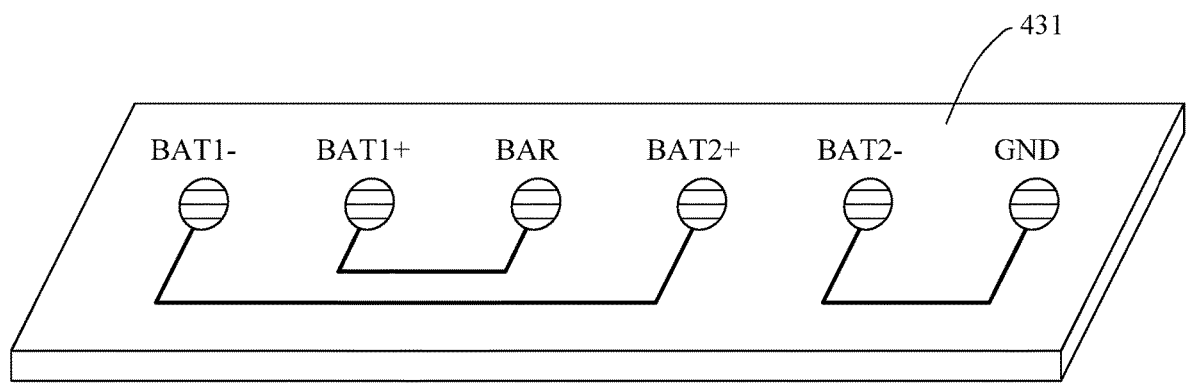
FIG. 4a is a schematic diagram showing the arrangement and connection relationship of the first group of contacts on the first surface of the bottom plate.

As shown in FIG. 4a, on the first surface, the first negative contact (BAT1−) and the second positive contact (BAT2+) are electrically connected, the first positive contact (BAT1+) and the second contact (BAR) are electrically connected, the second negative contact (BAT2−) and the ground contact (GND) are electrically connected.

With reference to FIG. 3 and FIG. 4a, when the bottom plate 430 is electrically connected to the battery cells with the first surface, the negative pole (−) of the first battery cell 410 and the positive pole (+) of the second battery cell 420 are electrically connected, and the negative pole (−) of the second battery cell 420 is grounded, thereby forming a series connection relationship. The first positive contact (BAT1+) and the second contact (BAR) in FIG. 4a may also be disconnected.

Figure 4B:
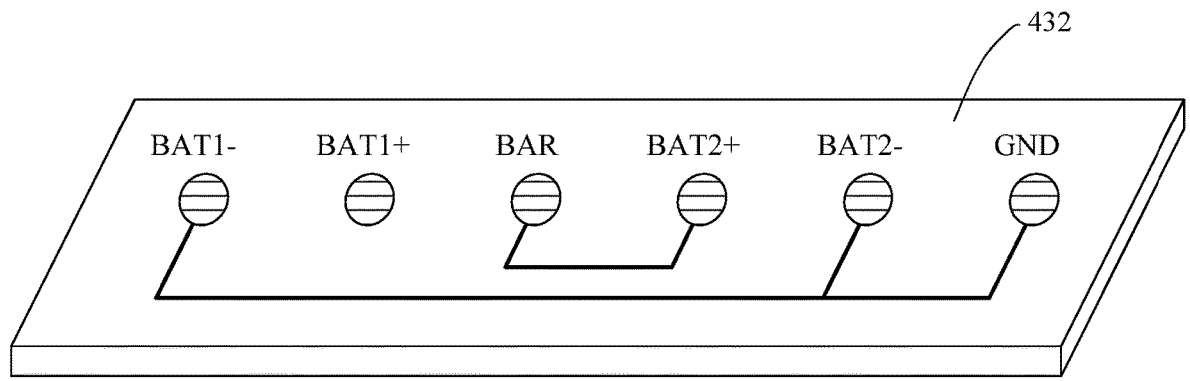
FIG. 4b is a schematic diagram showing the arrangement and connection relationship of the second group of contacts on the second surface of the bottom plate.

As shown in FIG. 4b, on the second surface, the first negative contact (BAT1−), the second negative contact (BAT2−) and the ground contact (GND) are electrically connected, the second contact (BAR) and the second positive contact (BAT2+) are electrically connected.

With reference to FIG. 3 and FIG. 4b, when the bottom plate 430 is electrically connected to the battery cells with the second surface, the negative pole (−) of the first battery cell 410 is grounded, such that the first battery cell 410 is connected between the positive output terminal (VCC) and the ground. The positive pole (+) of the second battery cell 420 is connected to the positive output terminal (VCC) through the second contact member 421 and the third contact member 440, and the negative pole (−) of the second battery cell 420 is grounded, such that the second battery cell 420 is connected between the positive output terminal (VCC) and the ground. The first battery cell 410 and the second battery cell 420 form a parallel connection relationship.

For example, when the voltage of a single-cell lithium battery is 3.5-4.1V, the total voltage is still 3.5-4.1V in parallel, and the total voltage in series is 7-8.2V. Therefore, it is low-power output in parallel and high-power output in series.

In this way, the series and parallel switching of the battery cells can be realized by changing the surface of the bottom plate in contact with the battery cells, to satisfy the user's demand for different power outputs.

Figure 5:
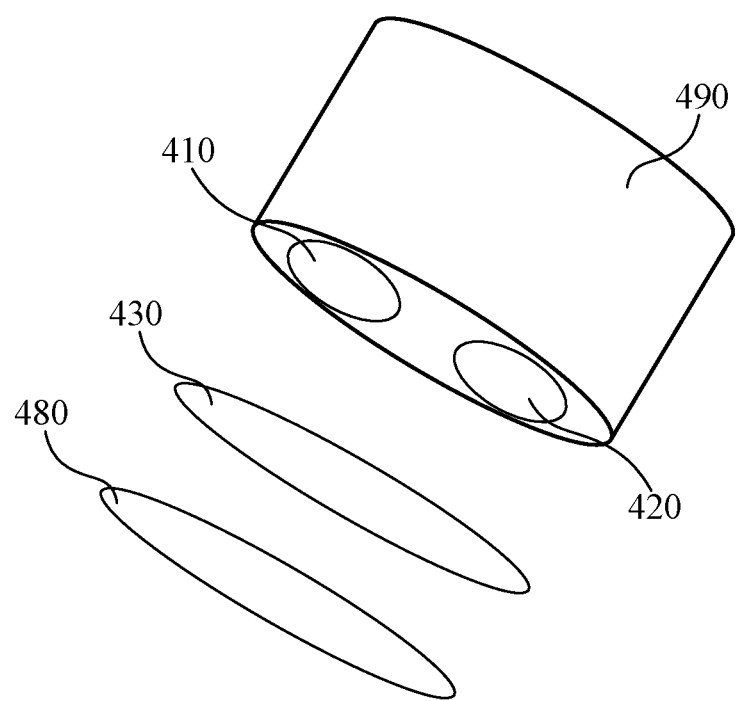
FIG. 5 is a schematic view of the power supply structure of FIG. 2.

Referring to FIG. 5, there is shown a schematic view of the power supply structure. The power supply structure 400 includes a battery receiving casing 490. The battery receiving casing 490 has a substantially cylindrical shape. The first battery cell 410 and the second battery cell 420 are received in the battery receiving casing 490, the bottom plate 430 is disposed opposite to the battery cells, the bottom plate 430 and the battery cells are electrically connected, and the bottom plate 430 is fixed by a cover 480. The contact members are not shown in FIG. 5. The contact members may be a pogo pin or an elastic electrode, and the elastic electrode may be an elastic sheet.

In one embodiment, the relative positional relationship between the contacts of the first group of contacts on the first surface is the same as the relative positional relationship between the contacts of the second group of contacts on the second surface. When the serial-parallel connection state of the battery cells needs to be switched, the cover 480 is opened, the bottom plate 430 is turned over and reinstalled, the operation is convenient. In this way, the electrical connection relationship between the bottom plate 430 and the battery cells is unchanged, but the electrical connection relationship between the contacts of the bottom plate 430 changes, thereby realizing switching between series connection and parallel connection.

Further, referring to FIG. 2, the power supply structure 400 may further include a first reverse protection circuit 460 and a second reverse protection circuit 470. The first reverse protection circuit 460 is connected between the positive pole (+) of the first battery cell 410 and the positive output terminal (VCC) of the power supply structure 400, and the second reverse protection circuit 470 is connected between the third contact member 440 (see FIG. 3) and the positive output terminal (VCC) of the power supply structure 400.

In one embodiment, the battery receiving casing 490 of the power supply structure 400 is configured to receive n battery cells (n is an integer not less than 2), which include the first battery cell 410 and the Nth battery cell (N=2, 3, 4, . . . , n). The power supply structure 400 includes a control circuit, the control circuit is formed on the bottom plate (circuit board), and the control circuit includes two groups of contacts provided on the bottom plate (circuit board). The two groups of contacts include a first group of contacts and a second group of contacts. It can be understood that the first group of contacts and the second group of contacts may be respectively provided on the front surface and the back surface of the bottom plate (circuit board), or may be provided on the same surface of the bottom plate.

In one embodiment, the first group of contacts are provided at a first position of the bottom plate, and the second group of contacts are provided at a second position of the bottom plate. The first position and the second position are symmetrical with respect to a central axis along the distribution direction of the contacts on the bottom plate.

In one embodiment, the first group of contacts includes: a first negative contact (BAT1−), a first positive contact (BAT1+) and a ground contact (GND); and an Nth contact, an Nth positive contact and an Nth negative contact, wherein N=2, 3, 4, . . . , n, and n is the number of battery cells; the Nth contact is a contact for connecting to a reverse protection circuit.

Specifically, the nth negative contact is electrically connected to the ground contact (GND), the nth positive contact is electrically connected to the (n-1)th negative contact, and the (n-1)th positive contact is electrically connected to the (n-2)th negative contact, and so on, until the second positive contact (BAT2+) is electrically connected to the first negative contact (BAT1−). Furthermore, the first positive contact (BAT1+) and the Nth contact are electrically connected. Thus, when the battery receiving casing 490 is received with the n battery cells, the n battery cells can form a series connection relationship. Further, the Nth battery cell can be connected to a reverse protection circuit through the Nth contact.

In one embodiment, the first group of contacts includes: a first negative contact (BAT1−) and a ground contact (GND); and an Nth contact, an Nth positive contact and an Nth negative contact, wherein N=2, 3, 4, . . . , n, and n is the number of battery cells.

Specifically, the nth negative contact is electrically connected to the ground contact (GND), the nth positive contact is electrically connected to the (n-1)th negative contact, and the (n-1)th positive contact is electrically connected to the (n-2)th negative contact, and so on, until the second positive contact (BAT2+) is electrically connected to the first negative contact (BAT1−). Thus, when the battery storage structure 490 is received with the n battery cells, the n battery cells can form a series connection relationship. Further, the Nth battery cell can be connected to a reverse protection circuit through the Nth contact.

In one embodiment, the second group of contacts includes: a first negative contact (BAT1−), a first positive contact (BAT1+) and a ground contact (GND); and an Nth contact, an Nth positive contact and an Nth negative contact, wherein N=2, 3, 4, . . . , n, and n is the number of battery cells; the Nth contact is a contact for connecting to a reverse protection circuit.

Specifically, the ground contact (GND) is electrically connected to the first negative contact (BAT1−) and the Nth negative contact, and the Nth positive contact is electrically connected to the Nth contact. Thus, when the battery receiving casing 490 is received with the n battery cells, the n battery cells can form a parallel connection relationship.

In one embodiment, the second group of contacts includes: a first negative contact (BAT1−) and a ground contact (GND); and an Nth contact, an Nth positive contact and an Nth negative contact, wherein N=2, 3, 4, . . . , n, and n is the number of battery cells;

Specifically, the ground contact (GND) is electrically connected to the first negative contact (BAT1−) and the Nth negative contact, and the Nth positive contact is electrically connected to the Nth contact. Thus, when the battery receiving casing 490 is received with the n battery cells, the n battery cells can form a parallel connection relationship. The difference from the previous embodiment is that the first positive contact (BAT1+) is not provided in this group of contacts.

In one embodiment, the positive pole (+) of the first battery cell 410 is connected to the first positive contact (BAT1+) through a contact member, and the negative pole (−) of the first battery cell 410 is connected to the first negative contact (BAT1−). The negative pole (−) of the Nth battery cell is connected to the Nth negative contact, and the positive pole (+) of the Nth battery cell is connected to the Nth positive contact through a contact member. The Nth contact is connected to a contact member, and the ground contact (GND) is connected to a contact member.

In one embodiment, the negative pole (−) of the first battery cell 410 is connected to the first negative contact (BAT1−). The negative pole (−) of the Nth battery cell is connected to the Nth negative contact, and the positive pole (+) of the Nth battery cell is connected to the Nth positive contact through a contact member. The Nth contact is connected to a contact member, and the ground contact (GND) is connected to a contact member.

When the first group of contacts are electrically connected to the n battery cells, a series connection relationship is formed between the n battery cells; when the second group of contacts are electrically connected to the n battery cells, a parallel connection relationship is formed between the n battery cells. It can be understood that the switching between the first group of contacts and the second group of contacts can be achieved by turning over the bottom plate, moving or rotating the bottom plate.

It can be understood that the second contact (BAR) and the second contact (BAR2) refer to the same contact.

It is noted that, when adding a battery cell into the battery receiving casing, three contacts are added into each group of contacts on the bottom plate. For example, if the nth battery cell is added, the nth contact (BARn), the nth positive contact (BATn+) and the nth negative contact (BATn−) are added into the first group of contacts or the second group of contacts. In the first group of contacts, the (n−1)th negative contact is electrically connected to the nth positive contact, and the nth negative contact (BATn−) is electrically connected to the ground contact (GND). In the second group of contacts, the ground contact (GND) is electrically connected to the nth negative contact (BATn−), and the nth contact (BARn) is electrically connected to the nth positive contact (BATn+).

In one embodiment, the battery receiving casing 490 of the power supply structure 400 is received with three battery cells. In this case, for the two groups of contacts on the bottom plate (circuit board), each group of contacts may include eight or nine contacts. Taking nine contacts as example, the nine contacts include a first negative contact (BAT1−), a first positive contact (BAT1+), a second contact (BAR2), a second positive contact (BAT2+), a second negative contact (BAT2−), a third contact (BAR3), a third positive contact (BAT3+), a third negative contact (BAT3−), and a ground contact (GND).

Figure 6:
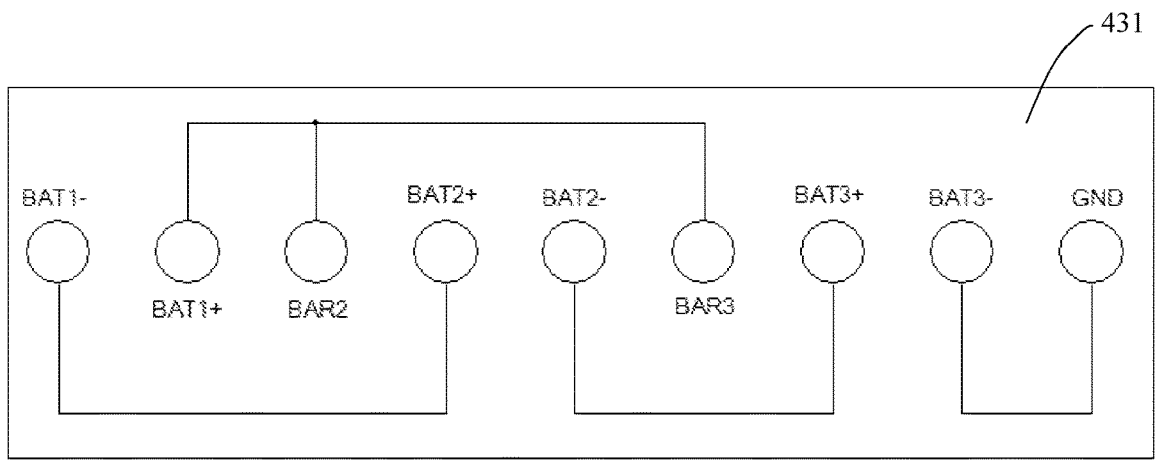
FIG. 6 is a schematic view showing the first group of contacts in another embodiment.

As shown in FIG. 6, the contacts of the first group of contacts are connected as follows:

The first negative contact (BAT1−) and the second positive contact (BAT2+) are electrically connected. The first positive contact (BAT1+), the second contact (BAR2) and the third contact (BAR3) are electrically connected. The second negative contact (BAT2−) and the third positive contact (BAT3+) are electrically connected. The third negative contact and the ground contact (GND) are electrically connected.

Figure 7:
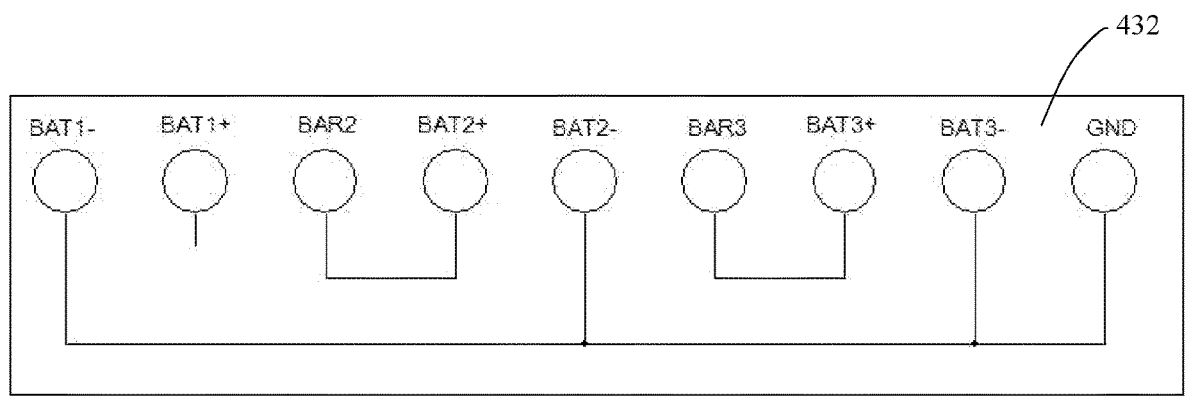
FIG. 7 is a schematic view showing the second group of contacts in another embodiment.

As shown in FIG. 7, the contacts of the second group of contacts are connected as follows:

The first negative contact (BAT1−), the second negative contact (BAT2−), the third negative contact (BAT3−) and the ground contact (GND) are electrically connected. The second contact (BAR2) and the second positive contact (BAT2+) are electrically connected. The third contact (BAR3) and the third positive contact (BAT3+) are electrically connected.

It can be understood that the power supply structure 400 may further include a first reverse protection circuit 460 and an Nth reverse protection circuit 470. The first reverse protection circuit 460 is connected between the positive pole (+) of the first battery cell 410 and the positive output terminal (VCC) of the power supply structure 400. The Nth reverse protection circuit 470 is connected between the contact member connected to the Nth contact and the positive output terminal (VCC) of the power supply structure 400.

In one embodiment, a control circuit is provided. The details of the control circuit are similar to those of the control circuit described above, and are not described herein again.

In one embodiment, an electronic cigarette is provided. The electronic cigarette includes the control circuit described above.

In one embodiment, an electronic cigarette is provided. The electronic cigarette includes the power supply structure 400 described above. Also included is a mode state indicating circuit 100, a microcontroller 200 and an atomizing circuit 300. The positive output terminal of the power supply structure 400 is connected to the power input terminals of the microcontroller 200 and the atomizing circuit 300. The microcontroller 200 is electrically connected to the mode state indicating circuit 100 and the atomizing circuit 300, respectively.

The power supply structure 400 supplies power to the microcontroller 200 and the atomizing circuit 300. The microcontroller 200 controls the operation of the atomizing circuit 300, and controls the mode state indicating circuit 100 to indicate a corresponding operating state of the power supply structure 400. By operating the bottom plate, the battery cells in the electronic cigarette are connected to different contacts on the bottom plate, to thereby change the series or parallel connection relationship of the battery cells for providing different power outputs. The operation is simple and convenient.

The technical features of the above-described embodiments may be arbitrarily combined. For the sake of brevity, all possible combinations of the technical features in the above embodiments are not described. However, as long as there is no contradiction between the combinations of these technical features, they should be considered as the scope of this description.

The above-described embodiments are merely illustrative of several embodiments of the present disclosure, and the description thereof is much specific and detailed, but is not to be construed as limiting the scope of the present disclosure. It should be noted that a number of variations and modifications may be made by those skilled in the art without departing from the spirit and scope of the present disclosure. Therefore, the scope of the present disclosure should be determined by the appended claims.

What is claimed is:

1. A power supply structure, comprising a battery receiving casing for receiving at least two battery cells, wherein the power supply structure further comprises a bottom plate provided with contacts, the bottom plate is disposed in the battery receiving casing;
   when the at least two battery cells are connected to a first group of contacts on the bottom plate, the at least two battery cells form a series connection relationship;
   when the at least two battery cells are connected to a second group of contacts on the bottom plate, the at least two battery cells form a parallel connection relationship;
   wherein the bottom plate has a first surface and a second surface, the first group of contacts are formed on the first surface, the second group of contacts are formed on the second surface.

2. The power supply structure according to claim 1, wherein the at least two battery cells comprise a first battery cell and a second battery cell, a positive pole of the first battery cell is led out through a lead wire and connected to a first contact member, a positive pole of the second battery cell is led out through a lead wire and connected to a second contact member;
   the positive pole of the first battery cell is further connected to a positive output terminal of the power supply structure through another lead wire;
   the power supply structure further comprises a third contact member which is led out through a lead wire and connected to the positive output terminal of the power supply structure;
   the power supply structure further comprises a fourth contact member which is led out through a lead wire and connected to a negative electrode of the power supply structure;
   the contacts on the bottom plate are electrically connected to the negative pole of the first battery cell, the first contact member, the negative pole of the second battery cell, the second contact member, the third contact member and the fourth contact member, respectively.

3. The power supply structure according to claim 2, wherein the first surface and the second surface are each provided with a first negative contact, a first positive contact, a second contact, a second positive contact, a second negative contact and a ground contact;
   the first negative contact, the first positive contact, the second contact, the second positive contact, the second negative contact and the ground contact on the first surface are configured for being electrically connected to the negative pole of the first battery cell, the first contact member, the third contact member, the second contact member, the negative pole of the second battery cell and the fourth contact member, respectively;
   the first negative contact, the first positive contact, the second contact, the second positive contact, the second negative contact and the ground contact on the second surface are configured for being electrically connected to the negative pole of the first battery cell, the first contact member, the third contact member, the second contact member, the negative pole of the second battery cell and the fourth contact member, respectively;
   on the first surface of the bottom plate, the first negative contact and the second positive contact are electrically connected, the first positive contact and the second contact are electrically connected, the second negative contact and the ground contact are electrically connected;
   on the second surface of the bottom plate, the first negative contact, the second negative contact and the ground contact are electrically connected, the second contact and the second positive contact are electrically connected.

4. The power supply structure according to claim 2, wherein the first contact member, the second contact member, the third contact member and the fourth contact member are each pogo pin.

5. The power supply structure according to claim 2, further comprising a first reverse protection circuit and a second reverse protection circuit, wherein the first reverse protection circuit is connected between the positive pole of the first battery cell and the positive output terminal of the power supply structure, the second reverse protection circuit is connected between the third contact member and the positive output terminal of the power supply structure.

6. The power supply structure according to claim 1, further comprising a cover which cooperates with the battery receiving casing to receive and fix the at least two battery cells and the bottom plate.

7. The power supply structure according to claim 1, wherein the first surface of the bottom plate is provided with a serial connection identification, and the second surface of the bottom plate is provided with a parallel connection identification.

8. An electronic cigarette, comprising a microcontroller, an atomizing circuit, and the power supply structure according to claim 1, wherein a positive output terminal of the power supply structure is connected to power input terminals of the microcontroller and the atomizing circuit, the microcontroller is electrically connected to the atomizing circuit.

9. The electronic cigarette according to claim 8, further comprising a mode state indicating circuit connected to the microcontroller.

10. The power supply structure according to claim 1, wherein the first surface and the second surface are two opposite surfaces of the bottom plate, when the serial-parallel connection state of the at least two battery cells needs to be switched, the bottom plate is turned over and reinstalled.

11. A control circuit, wherein the control circuit comprises a first group of contacts and a second group of contacts;
    when the first group of contacts are connected to at least two battery cells, the at least two battery cells form a series connection relationship;
    when the second group of contacts are connected to at least two battery cells, the at least two battery cells form a parallel connection relationship;
    wherein the first group of contacts and the second group of contacts are provided on different surfaces of a circuit board.

12. The control circuit according to claim 11, wherein the first group of contacts comprises:
    a first negative contact, a first positive contact and a ground contact; and
    an Nth contact, an Nth positive contact and an Nth negative contact, wherein N=2, 3, 4, . . . , n, and n is the number of battery cells;
    the nth negative contact is electrically connected to the ground contact, the nth positive contact is electrically connected to the (n-1)th negative contact, the (n-1)th positive contact is electrically connected to the (n-2)th negative contact, and so on, until the second positive contact is electrically connected to the first negative contact;
    the first positive contact and the Nth contact are electrically connected.

13. The control circuit according to claim 12, wherein the second group of contacts comprises:
    a first negative contact, a first positive contact and a ground contact; and
    an Nth contact, an Nth positive contact and an Nth negative contact, wherein N=2, 3, 4, . . . , n, and n is the number of battery cells;
    the ground contact is electrically connected to the first negative contact and the Nth negative contact, the Nth positive contact is electrically connected to the Nth contact.

14. The control circuit according to claim 11, wherein the first group of contacts comprises:
    a first negative contact and a ground contact; and
    an Nth contact, an Nth positive contact and an Nth negative contact, wherein N=2, 3, 4, . . . , n, and n is the number of battery cells;
    the nth negative contact is electrically connected to the ground contact, the nth positive contact is electrically connected to the (n-1)th negative contact, the (n-1)th positive contact is electrically connected to the (n-2)th negative contact, and so on, until the second positive contact is electrically connected to the first negative contact.

15. The control circuit according to claim 14, wherein the second group of contacts comprises:
    a first negative contact and a ground contact; and
    an Nth contact, an Nth positive contact and an Nth negative contact, wherein N=2, 3, 4, . . . , n, and n is the number of battery cells;
    the ground contact is electrically connected to the first negative contact and the Nth negative contact, the Nth positive contact is electrically connected to the Nth contact.

16. A power supply structure, comprising a battery receiving casing for receiving at least two battery cells, wherein the power supply structure further comprises the control circuit according to claim 11.

17. The power supply structure according to claim 16, wherein the battery receiving casing is received with the at least two battery cells which comprise a first battery cell and an Nth battery cell, wherein N=2, 3, 4, . . . , n, and n is the number of battery cells;
    if each group of contacts comprise a first negative contact, a first positive contact, a ground contact, an Nth contact, an Nth positive contact and an Nth negative contact, wherein N=2, 3, 4, . . . , n, and n is the number of battery cells;
    then the positive pole of the first battery cell is connected to the first positive contact through a contact member, the negative pole of the first battery cell is connected to the first negative contact, the negative pole of the Nth battery cell is connected to the Nth negative contact, the positive pole of the Nth battery cell is connected to the Nth positive contact through a contact member, the Nth contact is connected to a contact member, and the ground contact is connected to a contact member.

18. The power supply structure according to claim 16, wherein the battery receiving casing is received with the at least two battery cells which comprise a first battery cell and an Nth battery cell, wherein N=2, 3, 4, . . . , n, and n is the number of battery cells;
    if each group of contacts comprise a first negative contact, a ground contact, an Nth contact, an Nth positive contact and an Nth negative contact, wherein N=2, 3, 4, . . . , n, and n is the number of battery cells;
    then the negative pole of the first battery cell is connected to the first negative contact, the negative pole of the Nth battery cell is connected to the Nth negative contact, the positive pole of the Nth battery cell is electrically connected to the Nth positive contact through a contact member, the Nth contact is connected to a contact member, and the ground contact is connected to a contact member.

19. An electronic cigarette, wherein the electronic cigarette comprises the power supply structure according to claim 16.

20. The electronic cigarette according to claim 19, wherein the electronic cigarette further comprises a microcontroller and an atomizing circuit, a positive output terminal of the power supply structure is connected to power input terminals of the microcontroller and the atomizing circuit, the microcontroller is electrically connected to the atomizing circuit.

* * * * *